US010850712B2

(12) United States Patent
Dudar

(10) Patent No.: US 10,850,712 B2
(45) Date of Patent: Dec. 1, 2020

(54) SYSTEMS AND METHODS FOR REFUELING

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 16/124,664

(22) Filed: Sep. 7, 2018

(65) Prior Publication Data
US 2020/0079330 A1 Mar. 12, 2020

(51) Int. Cl.
| F02D 41/00 | (2006.01) |
| B60S 5/02 | (2006.01) |
| B60K 6/22 | (2007.10) |
| B60K 15/035 | (2006.01) |
| G05D 1/02 | (2020.01) |
| F02M 37/00 | (2006.01) |
| H04W 4/40 | (2018.01) |
| G01S 19/51 | (2010.01) |
| F02M 25/08 | (2006.01) |
| B60K 15/03 | (2006.01) |

(52) U.S. Cl.
CPC .............. *B60S 5/02* (2013.01); *B60K 6/22* (2013.01); *B60K 15/03504* (2013.01); *F02D 41/003* (2013.01); *F02M 37/0076* (2013.01); *G01S 19/51* (2013.01); *G05D 1/0212* (2013.01); *H04W 4/40* (2018.02); *B60K 2015/0321* (2013.01); *B60K 2015/03217* (2013.01); *B60K 2015/03514* (2013.01); *B60Y 2200/92* (2013.01); *F02M 25/089* (2013.01); *G05D 2201/0213* (2013.01)

(58) Field of Classification Search
CPC ................ B60K 6/22; B60K 15/03504; B60K 2015/0321; B60K 2015/03217; B60K 2015/03514; B60K 2015/0358; B60S 5/02; B60Y 2200/92; F02D 41/003; F02M 25/089; F02M 37/0076; G01S 19/51; G05D 1/0212; G05D 2201/0213; H04W 4/40
See application file for complete search history.

(56) References Cited

U.S. PATENT DOCUMENTS

| 9,751,396 | B2 | 9/2017 | Dudar | |
| 9,770,980 | B2 | 9/2017 | Dudar et al. | |
| 9,797,809 | B2 | 10/2017 | Dudar et al. | |
| 2011/0067777 | A1 | 3/2011 | Reddy | |
| 2015/0369150 | A1* | 12/2015 | Dudar | F02M 25/0836 123/519 |
| 2016/0221436 | A1* | 8/2016 | Lindlbauer | B60K 15/05 |
| 2017/0066322 | A1 | 3/2017 | Dudar | |
| 2018/0052467 | A1 | 2/2018 | Dudar | |
| 2018/0099856 | A1 | 4/2018 | Dudar | |

* cited by examiner

*Primary Examiner* — Anshul Sood
(74) *Attorney, Agent, or Firm* — Geoffrey Brumbaugh; McCoy Russell LLP

(57) ABSTRACT

Methods and systems are provided for refilling a fuel tank devoid of fuel vapors. In one example, a method may include, prior to an upcoming refueling event, conditioning a fuel vapor-less fuel tank by operating a fuel pump. Operation of the fuel pump may agitate and vaporize the residual fuel in the fuel tank.

20 Claims, 7 Drawing Sheets

SYSTEMS AND METHODS FOR REFUELING

FIELD

The present description relates generally to methods and systems for fuel tank refilling of motor vehicles, and hybrid vehicles in particular.

BACKGROUND/SUMMARY

Hybrid electric vehicles (HEVs) and plug-in hybrid vehicles (PHEVs) can operate for extended periods of time without operating the vehicle engine. Due to the infrequent engine use, the fuel tank may contain a minimal amount of fuel for prolonged durations causing fuel vapor from the tank to be replaced by air. Also, new fuel tanks in a manufacturing facility may not be conditioned with fuel vapor. A fuel tank that is filled with air instead of fuel (hydrocarbon) vapors may be referred as a "vapor-less fuel tank" or a "green fuel tank". Refueling a vapor-less fuel tank with fuel spray may result in flashing of the sprayed fuel and creation of an undesired air fuel mixture in the fuel tank.

Various approaches are provided for refueling a green fuel tank primarily filled with air. In one example approach, as shown in U.S. 2011/0067777, Reddy shows refueling a green fuel tank via an elongated flexible dispensing tube. The dispensing tube may be used to introduce the fuel to a bottom surface of the tank in a smooth flow without spraying. By delivering fuel in a smooth flow, fuel vapor may be confined to the bottom portion of the tank without filling the fuel tank with an air fuel mixture.

However, the inventors herein have recognized potential disadvantages with the above approach. As one example, use of specially designed fuel dispenser, as shown by Reddy, may be possible in a manufacturing plant for filling an unused fuel tank in a new vehicle. However, for on-road vehicles (HEVs and PHEVs) refueling at a regular gas station, it is not feasible to use a non-spraying fuel dispenser. By refueling the fuel tank with a fuel spray, the air fuel mixture in the tank may cause a spike in pressure. The increased pressure in the fuel tank may result in fuel to come out of the nozzle (fuel spit back) and a premature shut-off (PSO) of fueling. Due to the PSO, it may not be possible to fill the fuel vapor-less tank, thereby causing operator dissatisfaction.

The inventors herein have recognized that the issues described above may be addressed by a method for an engine coupled to a hybrid vehicle comprising: during vehicle operation in an electric-only mode for a longer than threshold duration, prior to an upcoming refill of a fuel tank devoid of hydrocarbon vapors, operating a fuel pump before fueling is underway. In this way, by preemptively conditioning the fuel vapor-less fuel tank with fuel vapor, spike in vapor pressure within the tank caused by the air fuel mixture may be reduced.

As one example, in a vehicle with a fuel vapor-less fuel tank filled with air, an upcoming fueling event may be predicted based on inputs from a navigation system, an external network, vehicle to infrastructure communication, a fuel filler door position, etc. In one example, based on an operator indicating a gas station as a destination in a navigation system or based on a current global positioning satellite (GPS) position of the vehicle, it may be inferred that the vehicle is entering a gas station. A start time for an upcoming fueling event may be predicted based on inputs from one or more on-board and external sources, and based on vehicle to vehicle (V2V) wireless commutation, and infrastructure to vehicle (I2V) wireless communication. Prior to initiation of fueling, the fuel pump may be activated to agitate the residual fuel remaining in the tank. Due to agitation of the remaining fuel, the fuel may vaporize, creating a fuel vapor environment in the fuel tank prior to fueling. Once fueling is initiated, the fuel pump may be deactivated.

In this way, by operating the fuel pump prior to an imminent refueling event, the fuel tank may be conditioned with fuel vapor and spraying of fuel during fueling may no longer cause a spike in fuel tank pressure. Due to the presence of the fuel vapor throughout the tank, a magnitude of fuel flashing in contact with air in the tank may be lower compared to an unconditioned tank. By averting the pressure spike, fuel spit back and premature shut-off (PSO) of fueling may be averted. By predicting an upcoming fueling event based on inputs from one or more vehicle systems and external sources, =the fuel pump may be activated prior to an actual initiation of fueling, thereby providing sufficient time for the residual fuel in the tank to vaporize and create a vapor dome in the tank. By preconditioning the fuel tank, refueling may be carried out with a spray-type fuel dispenser, as commonly seen in a gas station, without the need for specially modified fuel dispensers. Overall, by enabling fuel tank refill without PSO, operator satisfaction may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for refilling a fuel tank in a hybrid electric vehicles (HEVs) and plug-in hybrid vehicles (PHEVs). The systems and methods may be applied to a vehicle system where the fuel tank may be filled with air instead of hydrocarbon (fuel) vapors due to prolonged vehicle operation with a small amount (such as 5% of the total fuel tank capacity) of residual fuel in tank, such as the hybrid vehicle system depicted in FIG. 1. In one example, the fuel tank may be coupled to an engine, such as the engine depicted in FIG. 2.

Figure 3:
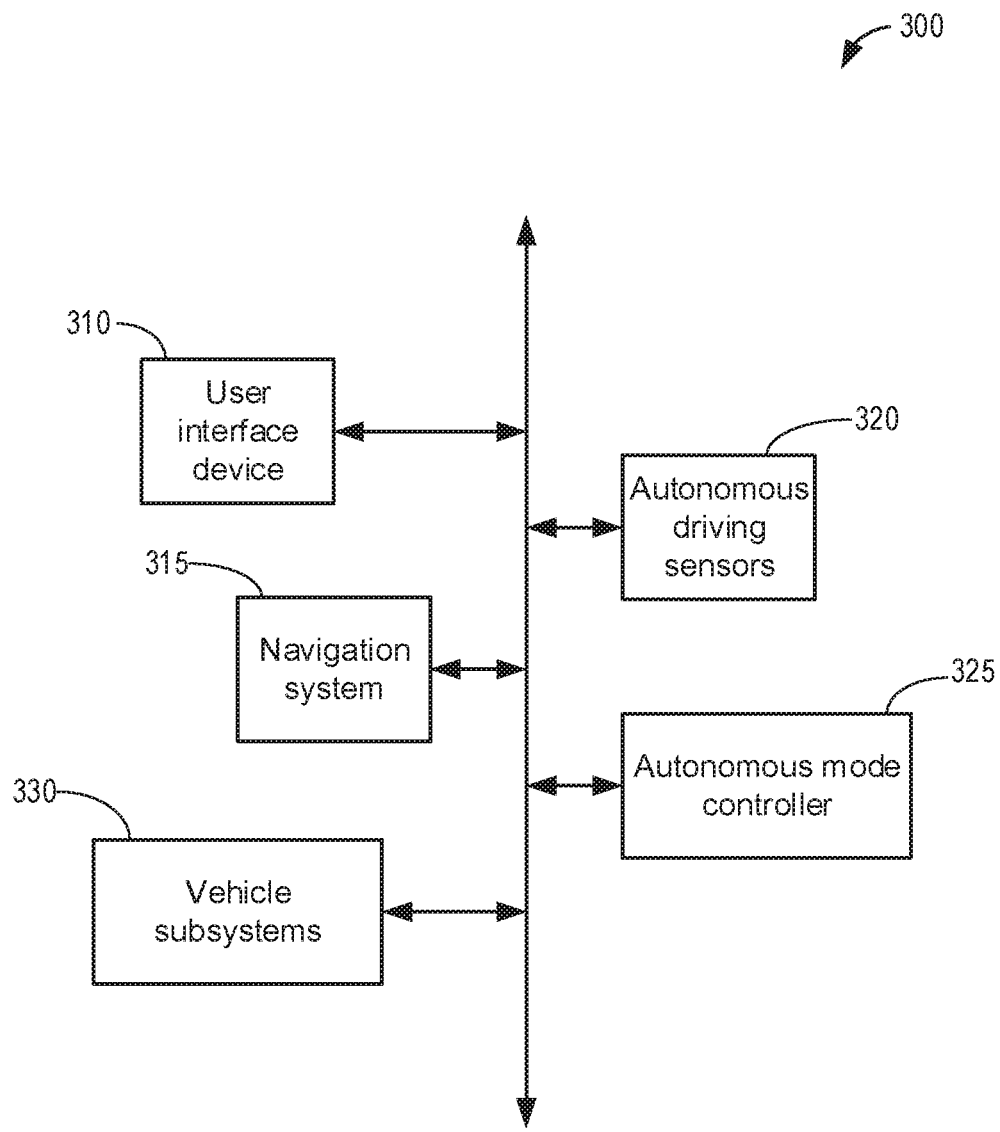
FIG. 3 schematically illustrates a block diagram of an example autonomous driving system.
Figure 6A:
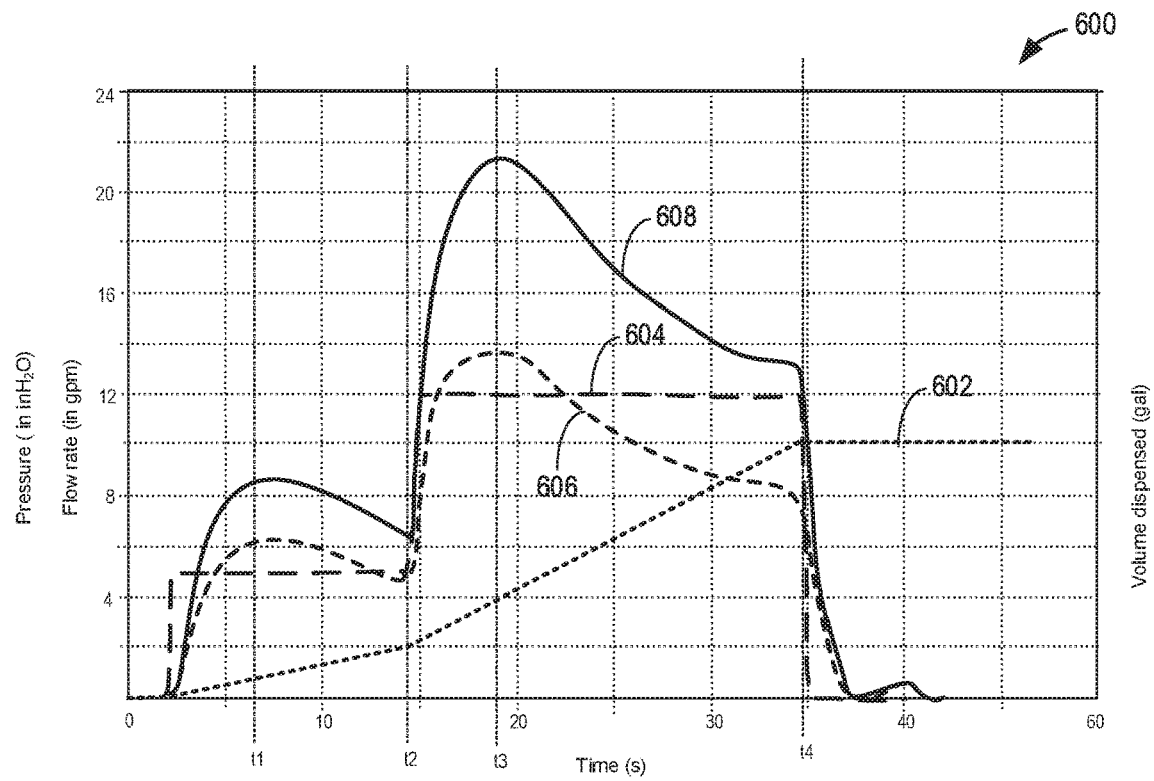
FIG. 6A shows an example plot of pressure change in an unconditioned, fuel tank during refueling.
Figure 6B:
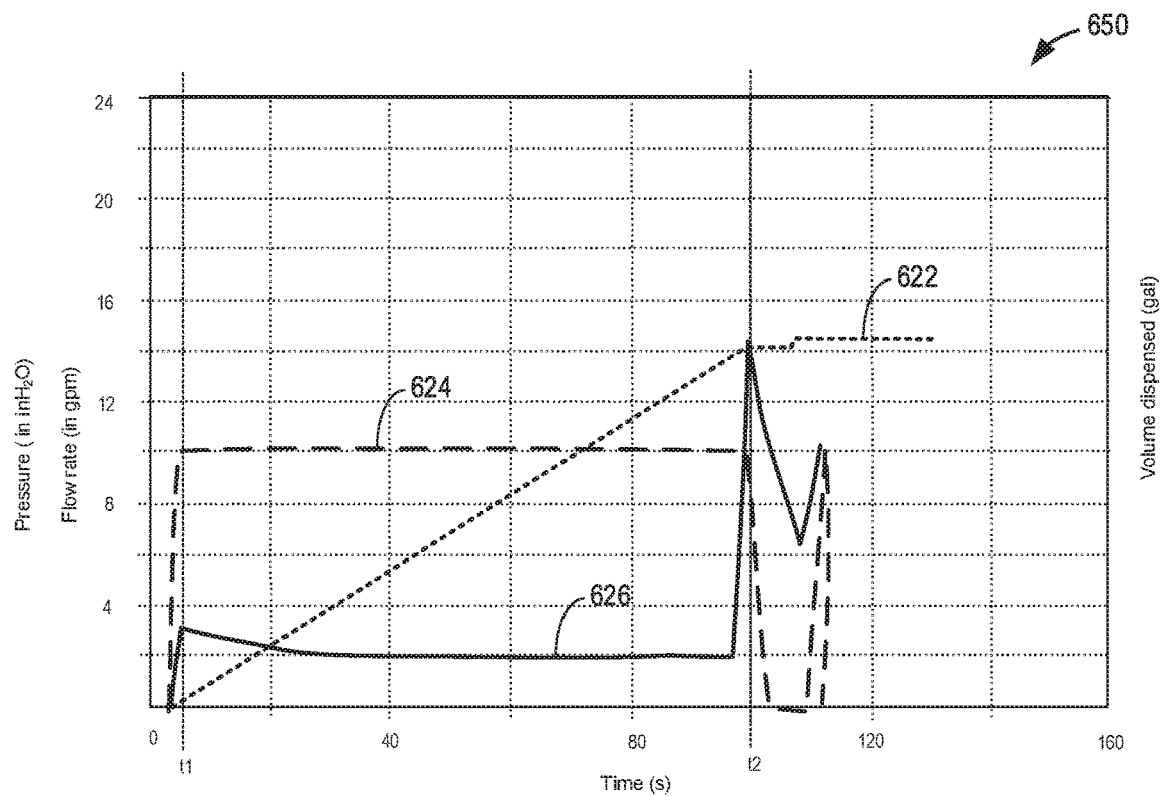
FIG. 6B shows an example plot of pressure change in a conditioned, fuel tank during refueling.
Figure 7:
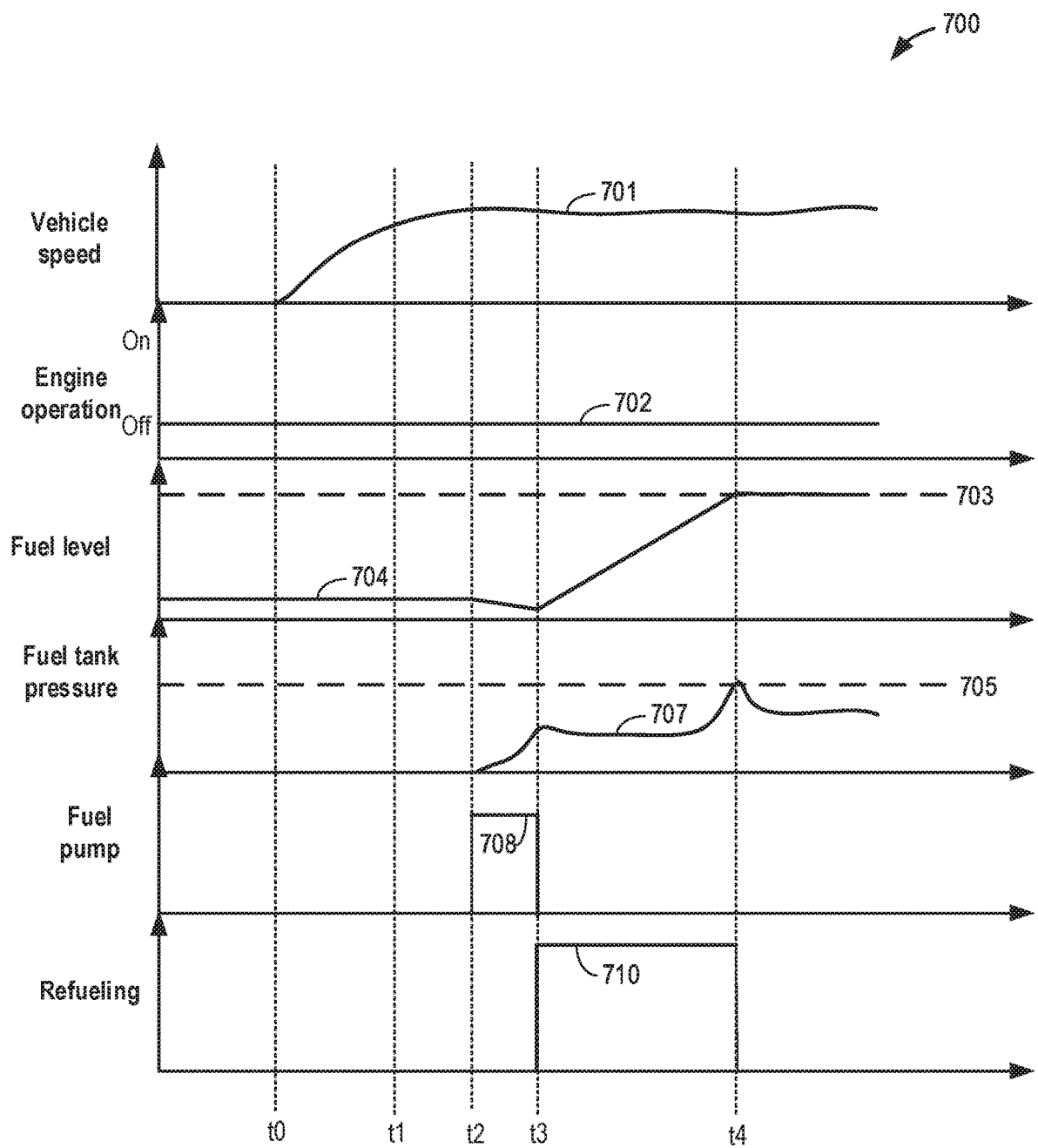
FIG. 7 shows an example refueling in a hybrid electric vehicle with a fuel vapor-free fuel tank.

Refueling may be carried out in an autonomous vehicle capable of being operated via an electric motor via an example autonomous vehicle control system, such as the system depicted in FIG. 3. An engine controller may be configured to perform control routines, such as the example routine of FIGS. 3 and 4, to fill an unused and a used vapor-less fuel tank, respectively. The unused fuel tank may be filled (for the first time) in a manufacturing facility while the used fuel tank to be refilled in an on-road vehicle may be pre-conditioned prior to refueling at a gas station. FIGS. 6A-6B show plots of variations in pressure in an unconditioned and a conditioned fuel tank, respectively, during refueling. An example conditioning of a fuel vapor-less fuel tank prior to refueling is shown in FIG. 7.

Figure 1:
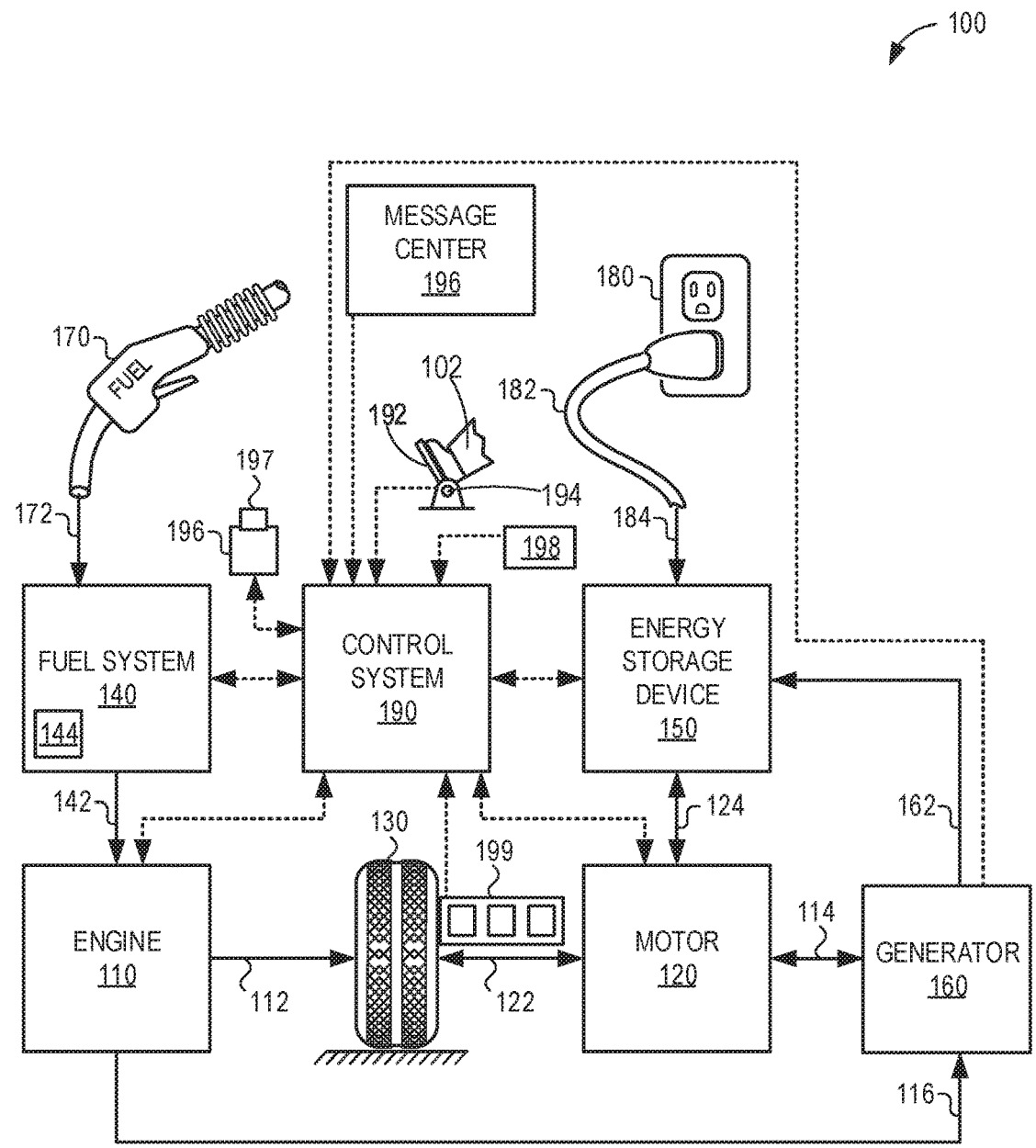
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor. The engine output may be utilized to propel the vehicle as indicated by arrow 112 or to recharge energy storage device 150 via motor 120 or generator 160.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Thus, liquid fuel may be supplied from fuel tank 144 to engine 110 of the motor vehicle. Still other suitable fuels or fuel blends may be supplied to engine 110, where they may be combusted at the engine to produce an engine output.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication in a vehicle instrument panel 196.

Hybrid vehicles may operate for extended periods of time via the motor 120 without operating the engine 110. Due to the infrequent engine use and lack of refueling, a residual amount of fuel may remain in the fuel tank 144. Fuel vapor in the tank 144 may be replaced by air. A fuel tank that does not contain fuel vapor and is filled with air may be termed as a fuel vapor-less tank. In order to refill a fuel vapor-less tank, it is desirable to precondition the tank such that the tank is filled with fuel vapor prior to the refilling. In one example, a fuel pump coupled to the fuel tank may be operated prior to an upcoming refueling to agitate and vaporize any residual fuel in the tank. The fuel pump may be activated at a first time, and deactivated at a second time, wherein the first time corresponds to a threshold duration remaining until a predicted initiation of fueling, and wherein the second time corresponds to a higher than threshold increase in a fuel level in the fuel tank or a higher than threshold increase in pressure in the fuel tank, the fuel level estimated via a fuel level sensor housed in the fuel tank and the pressure estimated via a pressure sensor coupled to the fuel tank. By conditioning the fuel tank 144 prior to refueling, air-fuel mixture may not occupy the tank upon spraying of fuel into the tank, thereby reducing the possibility of fuel spit back and premature shut-off (PSO) caused by pressure spike in the air fuel mixture.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
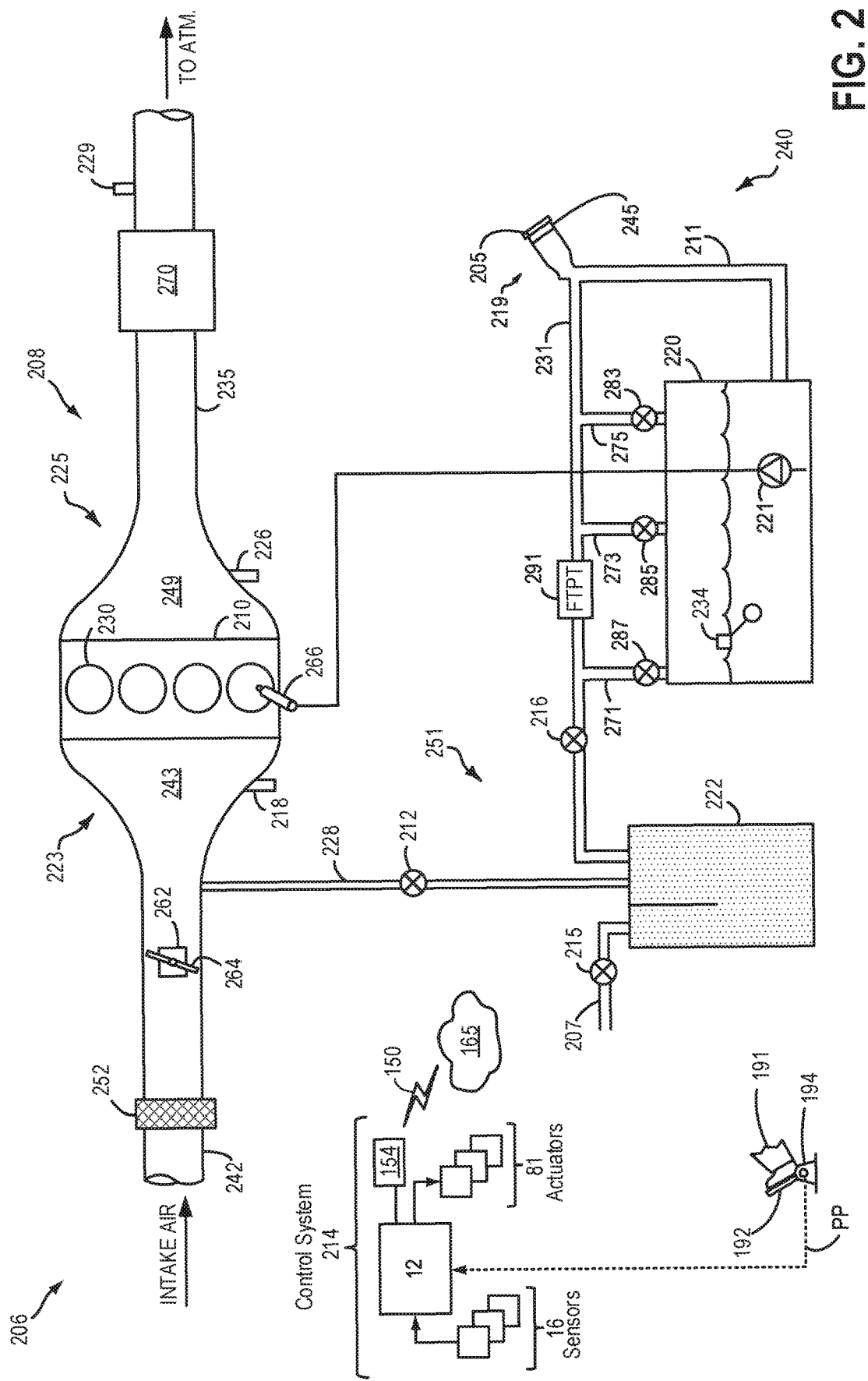
FIG. 2 schematically shows an example vehicle system with a fuel vapor-less fuel tank.

FIG. 2 shows a schematic depiction of a vehicle system 206. The vehicle system 206 includes an engine system 208 coupled to an emissions control system 251 (also termed, an evaporative emissions system) and a fuel system 240. Emission control system 251 includes a fuel vapor container or canister 222 which may be used to capture and store fuel vapors. In some examples, vehicle system 206 may be a hybrid electric vehicle system. In one example, hybrid vehicle system 206 may be configured as vehicle propulsion system 100 of FIG. 1.

The engine system 208 may include an engine 210 having a plurality of cylinders 230. Engine 210 may be controlled at least partially by a control system 214 including a controller 12 and by input from a vehicle operator 191 via an input device 192. In this example, input device 192 includes an accelerator pedal and a pedal position sensor 194 for generating a proportional pedal position signal PP. As such, engine 210 may be similar to engine 110 of FIG. 1 while control system 214 of FIG. 2 may be the same as control system 190 of FIG. 1.

Engine 210 includes an engine intake 223 and an engine exhaust 225. The engine intake 223 includes a throttle 262 coupled to intake manifold 243. Fresh intake air enters intake passage 242 and flows through air filter 252 before streaming past throttle 262 (also termed intake throttle 262) into intake manifold 243. Throttle 262 includes a throttle plate 264. In the depicted example a position of the intake throttle 262 (specifically, a position of the throttle plate 264) may be varied by controller 12 of control system 214 via a signal provided to an electric motor or actuator included with intake throttle 262, a configuration that is commonly referred to as electronic throttle control (ETC). In this manner, throttle 262 may be operated to vary an amount of intake air provided to intake manifold 243 and the plurality of cylinders therein.

The engine exhaust 225 includes an exhaust manifold 249 leading to an exhaust passage 235 that routes exhaust gas to the atmosphere. The engine exhaust 225 may include one or more emission control devices 270 (also termed emissions catalyst), which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 240 may include a fuel tank 220 coupled to a fuel pump 221. Fuel pump 221 is depicted situated within fuel tank 220 and supplying fuel to fuel injector 266 of engine 210. Further, fuel pump 221 may be a variable speed pump wherein the speed of the fuel pump can be modulated via the controller 12 based on different conditions. Alternatively, fuel pump 221 may be capable of operation at a single speed. As such, fuel pump 221 may be at least partially submerged or surrounded by fuel in fuel tank 220. It will be noted that alternative embodiments may include fuel pump 221 positioned outside of fuel tank 220 without departing from the scope of this disclosure. Herein, fuel pump 221 may not be surrounded by or submerged within fuel. Fuel tank 220 may be similar to fuel tank 144 introduced in FIG. 1. In one example, fuel tank 220 may include a liquid fuel such as gasoline. In another example, liquid fuel in fuel tank 220 may be gasoline and ethanol (e.g., E10, E85, etc.).

Fuel system 240 may include additional fuel pumps for pressurizing fuel delivered to the fuel injectors of engine 210. While only a single fuel injector 266 is shown in FIG. 2, additional injectors are provided for each of the plurality of cylinders 230. It will be appreciated that fuel system 240 may be a return-less fuel system, a return fuel system, or various other types of fuel system. A fuel level sensor 234 located in fuel tank 220 may provide an indication of the fuel level ("Fuel Level Input" or FLI) to controller 12. As depicted, fuel level sensor 234 may comprise a float connected to a variable resistor. Alternatively, other types of fuel level sensors may be used.

Vapors generated in fuel system 240 may be routed to evaporative emissions control system 251, specifically to fuel vapor canister 222 via vapor recovery line 231, before being purged to the engine intake 223. Fuel vapor canister 222 may also be termed fuel system canister or simply, canister 222 herein.

Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank vent valves may be included in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system 219 may include a fuel cap 205 for sealing off the fuel filler system from the atmosphere. The fuel cap may be concealed via a fuel filler door which may be unlocked by the operator prior to filling the fuel tank 220. Fuel filler system 219 may also be termed refueling system 219. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 12, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Fuel vapor canister 222 in evaporative emissions control system 251 may be filled with an appropriate adsorbent to temporarily trap fuel vapors (including vaporized hydrocarbons). Fuel vapor canisters in hybrid vehicles may receive refueling vapors generated during fuel tank refilling operation as well as diurnal vapors generated during daily changes in ambient temperature. In one example, the adsorbent used is activated charcoal. While a single canister 222 is shown, it will be appreciated that emissions control system 251 may include any number of canisters.

When purging conditions are met, such as when the canister is saturated, vapors stored in fuel system canister 222 may be purged to engine intake 223, specifically intake manifold 243, via purge line 228 by opening canister purge valve 212 (also termed, purge valve 212). Fresh air may be drawn through vent line 207 via canister vent valve 215 into canister 222 to enable desorption of stored fuel vapors from emissions control system 251. For example, canister vent valve 215 may be a normally open valve, which may be maintained open to draw fresh air into the canister 222 via vent line 207. Canister purge valve 212 may be normally closed but may be opened during certain conditions so that vacuum from engine intake manifold 243 is provided to the fuel vapor canister for purging desorbed fuel vapors.

Flow of air between canister 222 and the atmosphere may be regulated by canister vent valve 215. Fuel tank isolation valve 216 (FTIV 216) may control venting of vapors from fuel tank 220 into the canister 222 (and air into atmosphere). FTIV 216 may be positioned between the fuel tank and the fuel vapor canister within conduit 231. FTIV 216 may be a normally closed valve that when opened allows for the venting of fuel vapors from fuel tank 220 to canister 222. Air stripped of fuel vapors may then be vented from canister 222 to atmosphere via canister vent valve 215 and vent line 207. Fuel vapors stored in canister 222 may be purged to engine intake 223 via canister purge valve 212 at a later time.

Fuel system 240 may be operated by controller 12 in a plurality of modes by selective adjustment of the various valves and solenoids. For example, the fuel system may be operated in a fuel vapor storage mode (e.g., during a fuel tank refueling operation and with the engine not operating), wherein the controller 12 may open FTIV 216 and maintain canister vent valve 215 open while closing canister purge valve (CPV) 212 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 12 may open FTIV 216 and canister vent valve 215, while maintaining canister purge valve 212 closed, to depressurize the fuel tank before allowing fuel to be added therein. As such, FTIV 216 may be kept open during the refueling operation to allow refueling vapors to be stored in the canister. After refueling is completed, the FTIV may be closed.

As yet another example, the fuel system may be operated in a canister purging mode (e.g., after an emission control device light-off temperature has been attained and with the engine operating), wherein the controller 12 may open canister purge valve 212 and canister vent valve 215 while closing FTIV 216. Herein, the vacuum generated by the intake manifold of the operating engine may be used to draw fresh air through vent line 207 and through fuel vapor canister 222 to purge the stored fuel vapors into intake manifold 243. In this mode, the purged fuel vapors from the canister are combusted in the engine. The purging may be continued until the stored fuel vapor amount in the canister is below a load threshold.

A hybrid vehicle, e.g., vehicle system 206, may operate for extended durations without consuming fuel, such as gasoline, from a fuel tank of the hybrid vehicle. In other words, the hybrid vehicle may be propelled via motor torque alone for considerable periods of time and the engine, such as engine 210, may remain deactivated and shut down with a smaller amount (such as less than a liter) of fuel remaining in the fuel tank 220. In such cases, diurnal vapors may be generated from the fuel contained in the tank during daily changes in ambient temperature causing a majority of the fuel remaining in the fuel tank to vaporize. Over time, the fuel vapor may be routed to the canister 222 via the vapor recovery line 231 and the fuel tank 220 may be filled with air. If during a subsequent refueling, fuel is sprayed to the fuel tank 220, the air fuel mixture created in the tank may cause undesired pressure spikes in the fuel tank.

A start time for an upcoming filling of the fuel tank at a gas station may be predicted based on one or more of a time remaining for the vehicle to reach a fueling station at the gas station and a fuel filler door being commanded to an open position and an average wait time for refueling at the gas station. The fuel pump may be activated at a threshold duration prior to the predicted start time of refueling and then deactivated in response to an increase in fuel level in the fuel tank, the threshold duration based on the lower than threshold amount of liquid fuel in the tank and a vapor pressure of the fuel in the fuel tank 220. Due to operation of the pump, liquid fuel remaining in the tank (such as at the bottom or on the walls) may get agitated and vaporize, thereby creating a vapor dome within the fuel tank. The controller may infer a formation of the fuel vapor dome based on an increase in pressure in the fuel tank, as estimated via the FTPT sensor 291. Details of the conditioning method for the fuel tank prior to an imminent refueling is discussed below with reference to FIG. 5.

Controller 12 may comprise a portion of a control system 214. Control system 214 is shown receiving information from a plurality of sensors 16 (various examples of which are described herein) and sending control signals to a plurality of actuators 81 (various examples of which are described herein). As one example, sensors 16 may include fuel level sensor 234, exhaust gas sensor 226 located upstream of the emission control device 270, manifold absolute pressure (MAP) sensor 218, post-catalyst exhaust sensor 229, and fuel tank pressure sensor 291 (also termed a fuel tank pressure transducer or FTPT). Other sensors such as barometric pressure, ambient temperature, air/fuel ratio, and composition sensors may be coupled to various locations in the vehicle system 206. For example, temperature of fuel in the fuel tank may be monitored via a fuel tank temperature sensor (not shown). As another example, the actuators 81 may include fuel injector 266, throttle 262, fuel tank isolation valve 216, fuel pump 221, purge valve 212, and refueling lock 245. The controller 12 may receive input data from the various sensors, process the input data, and trigger the actuators in response to the processed input data based on instruction or code programmed therein corresponding to one or more routines.

The controller may employ various actuators (such as those described above) to adjust engine operation, and vehicle operation based on signals received from the various sensors and instructions stored on a memory of the controller. For example, in anticipation of refueling, the controller may send a signal to an actuator coupled to the fuel pump 221 top activate the fuel pump. The controller may then estimate initiation of fueling via the fuel level sensor 234 and send a signal to the actuator coupled to the fuel pump 221 deactivate the fuel pump 221.

A navigation system 154 may be coupled to the control system 214 to determine location (e.g., GPS co-ordinates of the vehicle) of the vehicle 110 at any instant of time. The navigation system may be connected to an external server and/or network cloud 165 via wireless communication 150. The control system 214 may also communicate with onboard controllers of vehicles in a fleet or an infrastructure (such as a gas station) via their respective navigation system 154, via wireless communication device 152, and/or via other forms of vehicle to vehicle technology (V2V) and infrastructure to vehicle (I2V) technology. In one example, the fleet may be within a threshold radius of the vehicle 206. As an example, a controller may infer an upcoming refueling event via one or more of a position of the vehicle, a destination indicated on the navigation system 154, an opening of a fuel filler door, a communication between a gas station and the vehicle via I2V wireless technology, and communication between one or more vehicles at the gas station and the vehicle and a communication between one or more vehicles at the gas station and the vehicle via V2V wireless technology.

FIG. 3 is a block diagram of an example autonomous driving system 300 that may operate the vehicle system 100, described above at FIG. 1. Herein, the vehicle system 100 will be referred to simply as a "vehicle". The autonomous driving system 300, as shown, includes a user interface device 310, a navigation system 315, at least one autonomous driving sensor 320, and an autonomous mode controller 325.

The user interface device 310 may be configured to present information to vehicle occupants, under conditions wherein a vehicle occupant may be present. However, it may be understood that the vehicle may be operated autonomously in the absence of vehicle occupants, under certain conditions.

The presented information may include audible information or visual information. Moreover, the user interface device 310 may be configured to receive user inputs. Thus, the user interface device 310 may be located in the passenger compartment (not shown) of the vehicle. In some possible approaches, the user interface device 310 may include a touch-sensitive display screen.

The navigation system 315 may be configured to determine a current location of the vehicle using, for example, a Global Positioning System (GPS) receiver configured to triangulate the position of the vehicle relative to satellites or terrestrial based transmitter towers. The navigation system 415 may be further configured to develop routes from the current location to a selected destination, as well as display a map and present driving directions to the selected destination via, for example, the user interface device 310.

The autonomous driving sensors 320 may include any number of devices configured to generate signals that help navigate the vehicle. Examples of autonomous driving sensors 320 may include a radar sensor, a lidar sensor, a vision sensor (e.g. a camera), vehicle to vehicle infrastructure networks, or the like. The autonomous driving sensors 320 may enable the vehicle to "see" the roadway and vehicle surroundings, and/or negotiate various obstacles while the vehicle 100 is operating in autonomous mode. The autonomous driving sensors 320 may be configured to output sensor signals to, for example, the autonomous mode controller 325.

The autonomous mode controller 325 may be configured to control one or more subsystems 330 while the vehicle is operating in the autonomous mode. Examples of subsystems 430 that may be controlled by the autonomous mode controller 325 may include a brake subsystem, a suspension subsystem, a steering subsystem, and a powertrain subsystem. The autonomous mode controller 325 may control any one or more of these subsystems 330 by outputting signals to control units associated with subsystems 330. In one example, the brake subsystem may comprise an anti-lock braking subsystem, configured to apply a braking force to one or more of wheels. Discussed herein, applying the braking force to one or more of the vehicle wheels may be referred to as activating the brakes. To autonomously control the vehicle, the autonomous mode controller 325 may output appropriate commands to the subsystems 330. The commands may cause the subsystems to operate in accordance with the driving characteristics associated with the selected driving mode. For example, driving characteristics may include how aggressively the vehicle accelerates and decelerates, how much the vehicle space leaves behind a front vehicle, how frequently the autonomous vehicle changes lanes, etc.

In this way, the components of FIGS. 1-3 enable an autonomous vehicle system, comprising: a controller with computer readable instructions stored on non-transitory memory that when executed during operation of the autonomous vehicle system cause the controller to: infer an upcoming refueling event via one or more of a position of the vehicle, a destination indicated on a navigation system coupled to the vehicle, and an opening of a fuel filler door, during a first condition, operate a fuel pump coupled to a fuel tank prior to the refueling event until the refueling event is initiated, and during a second condition, maintain the fuel pump inactive prior to the refueling event. The first condition includes a fuel tank coupled to an engine of the vehicle containing a lower than threshold amount of fuel vapor and a higher than threshold amount of air, and the second condition includes the fuel tank containing a higher than threshold amount of fuel vapor and a lower than threshold amount of air.

Figure 4:
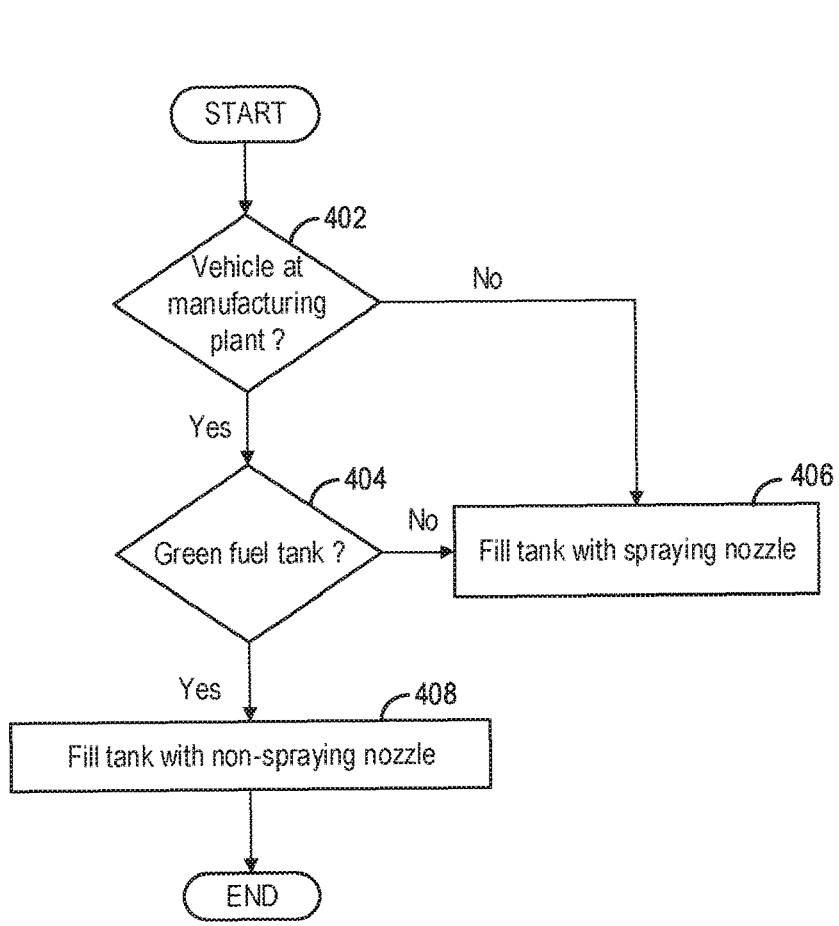
FIG. 4 shows a flowchart for an example method for filling a green fuel tank.

FIG. 4 shows an example method 400 for filling an unused (green) fuel tank. Instructions for carrying out method 400 and the rest of the methods included herein may be executed by a controller based on instructions stored on a memory of the controller and in conjunction with signals received from sensors of the engine system, such as the sensors described above with reference to FIG. 2. The controller may employ engine actuators of the engine system to adjust engine operation, according to the methods described below.

At 402, the routine includes determining if the vehicle is at the manufacturing plant where it is being assembled. For example, one or more sensor inputs from sensors of the vehicle may cause the controller to determine that the vehicle is at the manufacturing plant. For example, the vehicle may be plugged into an electrical input at the manufacturing plant or a user input from outside the vehicle may be received at the controller of the vehicle indicating the vehicle is at the manufacturing plant. If it is determined that the vehicle is still at the manufacturing plant and has not yet been delivered to a dealership or customer, at 404, the routine includes determining if a fuel tank coupled to an engine of the vehicle is in a green condition. A fuel tank that has not been used and in which fuel (hydrocarbon) has never been delivered (or stored) may be referred herein as a green tank. Said another way, a green tank is an unused fuel tank.

If it is determined that the fuel tank is a green fuel tank, at 408, a non-spraying nozzle, specifically designed for filling a new fuel tank may be used to deliver fuel to the green fuel tank. Due to the non-spraying characteristic of the nozzle, the fuel may be delivered at a lower continuous rate relative to a rate of fuel delivery using a spraying nozzle at a gas station. The non-spraying nozzle may be designed to deliver fuel to the bottom portion of the tank. Due to the agitation caused during fueling, a part of the fuel may vaporize. The slow filling of fuel from the bottom of the tank may gradually displace the air in the green tank with fuel vapor. By gradually displacing air with liquid fuel and fuel vapor, flashing of fuel in contact with air and consequent pressure spikes may be averted. If it is determined that the fuel tank is not green such as if fuel has been previously delivered and stored at the fuel tank, at 406, the fuel tank may be filled with fuel using a regular spraying nozzle (as seen at a gas station). After assembly, the vehicle may be operated in the manufacturing facility and may be refueled a plurality of times. Also, at 402, if it is determined that the vehicle is not at the manufacturing plant, the routine may proceed to step 406, wherein the refueling may be carried out at a gas station using a regular spraying nozzle.

Figure 5:
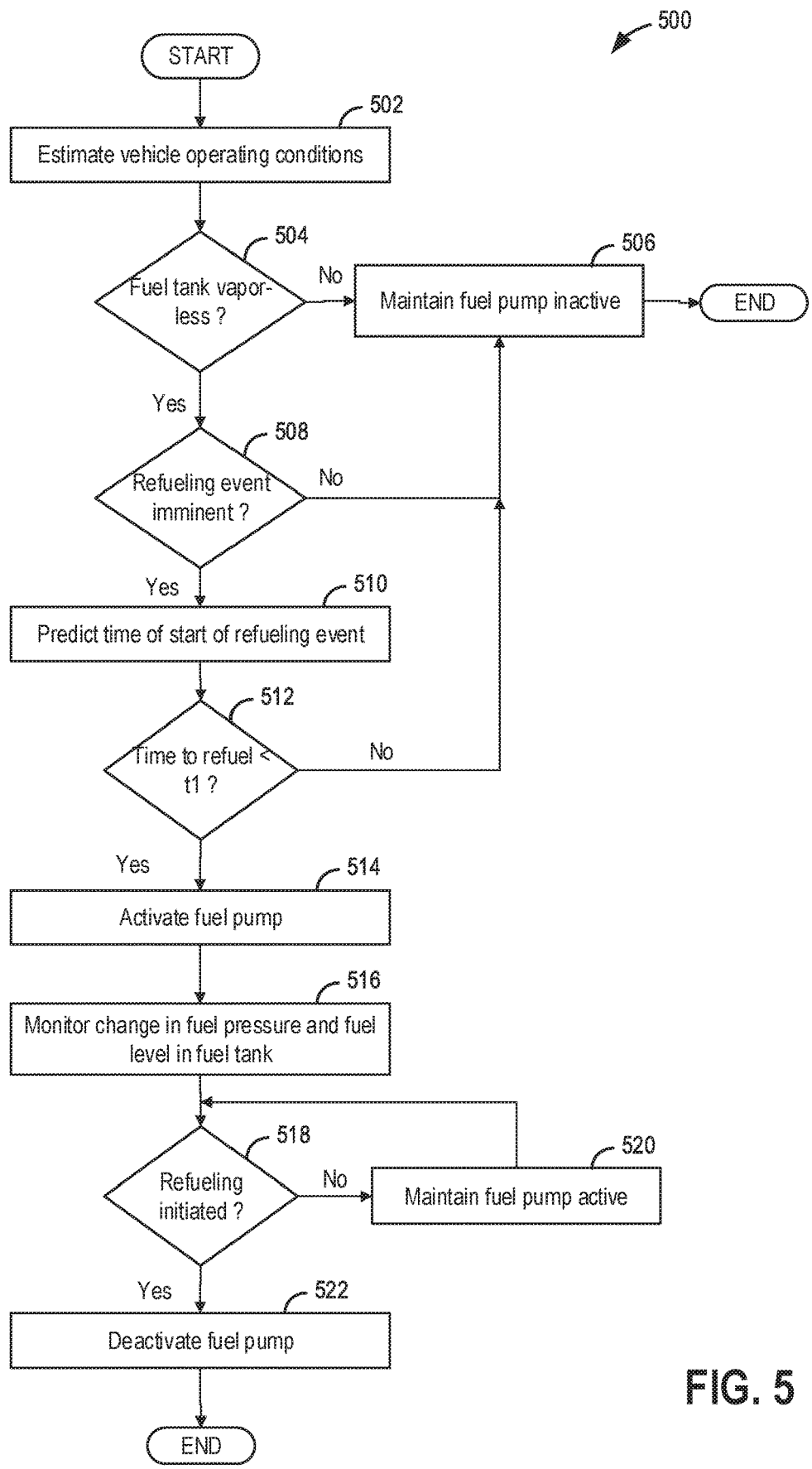
FIG. 5 shows a flowchart for an example method for conditioning a fuel vapor-less fuel tank prior to refueling.

FIG. 5 shows an example method 500 that can be implemented to preemptively condition a fuel tank prior to refueling. At 502, vehicle operating conditions may be estimated and/or measured. The vehicle may be a hybrid vehicle which may be operated via motor torque and/or engine torque. Vehicle operating conditions may be measured, estimated or inferred, and may include vehicle speed, motor torque and/or engine torque supplied to propel the vehicle, as well as various engine conditions, such as fuel level in a fuel tank. The controller may retrieve each of a first duration of time elapsed since an immediately previous operation of the engine and a second duration of time elapsed since an immediately previous refueling. Also, ambient conditions such as ambient temperature, pressure, and humidity may be estimated.

At 504, the routine includes determining if conditions are met for a fuel vapor-less fuel tank. In one example, a fuel tank (such as fuel tank 220 in FIG. 2) may be termed as a "fuel vapor-less fuel tank" if it is filled with air instead of fuel (hydrocarbon) vapors. A new fuel tank that has not been used (such as in a manufacturing plant) is a green fuel tank. Conditions for a green fuel tank may include a lower than threshold percentage of fuel vapors in the fuel tank relative to air. In one example, the threshold percentage of fuel vapors may be zero percent. The threshold percentage may be calibrated based on physical and chemical properties (such as vapor pressure, flash point, etc.) of the fuel used. As an example, if a lower than threshold percentage of vapor pressure is present in the fuel tank, upon refilling the tank with a fuel spray, fuel flashing may cause a higher than threshold pressure (such as more than 20 InH$_2$O) in the fuel tank. Conditions for a fuel vapor-less fuel tank may also include a lower than threshold pressure in the fuel tank. The threshold pressure may be a non-zero, positive threshold calibrated based on fuel vapor pressure and atmospheric pressure.

Conditions for a fuel vapor-less fuel tank may further include a lower than threshold fuel level in the fuel tank. The threshold fuel level may calibrated to a fuel level at which fuel vapor may not be formed within the fuel tank without agitation. Fuel in the tank may not be agitated if the fuel is not supplied to the cylinders for combustion. In one example, the fuel tank may retain a residual fuel amount of 5% of the capacity of the fuel tank. The residual fuel may be at the bottom or along the walls of the fuel tank.

Conditions for a fuel vapor-less fuel tank may also further include engine inactivity for a higher than threshold duration when the fuel level in the fuel tank at the immediately prior engine shut-down is lower than the threshold fuel level. During prolonged engine-off periods, if the fuel level in the fuel tank is lower than the threshold, fuel vapor may not be generated in the fuel tank. Each of the threshold fuel level and the threshold duration may be calibrated based on characteristics (such as vapor pressure) of the fuel used in the vehicle. A fuel with a lower vapor pressure may be more volatile relative to a fuel with a higher vapor pressure.

As an example, during the period of engine inactivity, a majority of the remaining fuel in the fuel tank may vaporize due to daily changes in ambient conditions and the vapor may gradually escape from the fuel tank to a canister (such as canister 222 in FIG. 2) of an on-board evaporative emissions control system. From the canister, the fuel vapors may be purged to the engine cylinders (to be combusted during a subsequent engine operation). During diurnal cooling cycles, air may enter and fill the fuel tank via a clean canister. The canister may be clean (not containing fuel vapors) immediately after purging the content of the fuel vapor to the engine cylinders. Purging to the stored fuel vapor may be carried out during engine off conditions. The purged fuel vapor may be combusted during subsequent engine operations. In this way, a fuel tank which has been used to store and supply fuel to an engine may be "regreened" based on absence of fuel vapor in the tank.

In one example, an engine system may include multiple fuel tanks, each containing a different fuel variety. During engine operation, fuel from a single fuel tank may be used while another fuel tank may become "fuel vapor-less" due to lack of fuel vapor and presence of air.

If it is determined that conditions are not met for a fuel vapor-less fuel tank, at 506, the fuel pump (of the vehicle, such as fuel pump 221 shown in FIG. 2) may be maintained in an inactive condition prior to or during an immediately subsequent refueling event. At 508, the routine includes determining if a refueling event is imminent (upcoming or expected). An imminent refueling event includes a refueling event anticipated within a threshold duration in the drive cycle. As an example, the threshold duration may be 20 minutes. As another example, the threshold duration may be 15 minutes. As yet another example, the threshold duration may be in a range of 10-30 minutes.

A controller may infer (predict) that a refueling event is imminent based on one or more of a proximity of the vehicle to a gas station, the gas station being indicated at a destination in a navigation system coupled to the vehicle, and a fuel filler door being commanded to an open position. A current position of the vehicle and a proximity of the vehicle to the gas station may be inferred based on the GPS coordinate of the vehicle as retrieved from the navigation system and a GPS coordinate of the gas station. In one example, based on the GPS coordinates, the controller may infer that the vehicle is within 200 meters of the gas station.

Proximity to the gas station may be further based on an infrastructure to vehicle (I2V) communication between the gas station and the hybrid vehicle or a vehicle to vehicle (V2V) communication between a fleet of vehicle at the gas station and the vehicle. The controller may communicate with on-board controllers of vehicles in a fleet or an infrastructure (such as the gas station) via their respective navigation system, via wireless communication device, and/or via other forms of vehicle to vehicle technology (V2V) and infrastructure to vehicle (I2V) technology to determine if the vehicle is close to a gas station. In one example, the fleet may be within a threshold radius (such as 200 meters) of the gas station. If it is determined that the vehicle is entering a gas station, it is likely that refueling is imminent. If at the onset or during the drive cycle, if the operator indicates (via the navigation system) a gas station as the final or an intermediate destination, it may be inferred that a refueling event is imminent.

A controller may determine if a refueling event is imminent based on a refuel request made by the operator by depressing a refueling button on a vehicle instrument panel. Further, the operator may unlock the fuel filler door via depression of a switch in the vehicle cabin or by manually opening the fuel filler door.

If a refueling event is not imminent, the routine may proceed to 406 and the fuel pump may be maintained in an inactive condition. If it is determined that a refueling event is imminent, at 510, the controller may also predict that the start time of the imminent refueling event based on an estimated a time remaining for the vehicle to reach the gas station and/or indication of the operator (depression of refueling button or opening of fuel filler door). The controller may retrieve the distance of the vehicle from the gas station from the navigation system and current traffic condition (immediately ahead of the vehicle) from the navigation system or from an external cloud, and estimate the time remaining for the vehicle to reach the gas station. If the time remaining for the vehicle to reach the gas station is shorter, the initiation of fueling may occur within a shorter duration. Whereas, if the time remaining for the vehicle to reach the gas station is longer, the initiation of fueling may occur within a longer duration. Also, if the operator has depressed the refueling button or opened the fuel filler door, refueling may be initiated shortly such as within 5 minutes.

While predicting the start time, the controller may also take into account an average wait time for a vehicle at the gas station before refueling is initiated. As an example, the average wait time may include a duration elapsed between a time when a vehicle enters the gas station and when fueling is initiated. In one example, in order to calculate the average wait time, individual wait times for 5 vehicles may be monitored and a mean wait time may be calculated. The average wait time may be estimated based on communication with the fleet of vehicles (V2V) or the gas station infrastructure (I2V). The wait time may increase with a higher number of vehicles waiting for refueling ahead of the vehicle. The wait time may be higher during certain hours in the day such as during evenings.

At 512, the routine includes determining if a time remaining to initiate refueling is lower than (or equal to) a threshold duration (t1). The threshold duration may correspond to a time desired to vaporize the remaining fuel in the tank by agitating the tank. The controller may calibrate (such as by using a look-up table) the threshold duration based on a level of residual fuel in the tank and physical and chemical properties (density, viscosity, distillation profile, boiling point etc.) of the fuel. If it is determined that the time to start the refueling is greater than t1, the routine may proceed to 506, and the fuel pump may be maintained in an inactive condition.

If it is determined that a lower than (or equal to) t1 time is remaining to a predicted initiation of refueling, at 514, the controller may send a signal to an actuator of a fuel pump housed inside or coupled to the fuel tank to activate (start operation) the fuel pump. Operation of the fuel pump may cause the fuel tank to vibrate and the residual fuel contained in the tank to be agitated. Due to the energy being imparted to the fuel, the temperature of the fuel may increase and the fuel may vaporize. In this way, activation of fuel pump causes an increase in fuel vapor pressure in the fuel pump.

During vehicle operation via engine torque, fuel may be supplied to the engine cylinders from the fuel tank via one or more fuel injectors. During the fuel injection, the fuel pump may be operated to transport the fuel from the fuel tank to the injectors. During conditions when fuel injection is not desired, the pump may be maintained in an off condition. In one example, in order to agitate residual fuel in the fuel tank, the pump may be operated at a speed that is lower than a speed of operation of the pump during fuel injection. In another example, in order to agitate residual fuel in the fuel tank, the pump may be operated at a speed that is higher than the speed to operate the pump during fuel injection. In yet another example, in order to agitate residual fuel in the fuel tank, the pump may be operated at a speed that is equal to the speed of operation of the pump during fuel injection.

As the residual fuel in the fuel tank is vaporized, at 516, a change in fuel vapor pressure and fuel level in the fuel tank may be monitored via a fuel tank pressure sensor (such as FTPT 291 in FIG. 2) and a fuel level sensor (such as fuel level sensor 234 in FIG. 2), respectively. Due to vaporization of fuel in the fuel tank, a vapor dome may be formed causing an increase in fuel tank pressure. Also, as liquid fuel changes to gaseous vapor, the fuel level in the tank may decrease.

At 518, the routine includes determining if refueling has been initiated (fuel is being delivered to the tank). The controller may infer that refueling has be initiated based on an increase in fuel level in the tank. In one example, any increase in fuel level in the fuel tank may confirm an initiation of fueling. In another example, a higher than threshold increase in the fuel level may confirm an initiation of fueling. The threshold fuel level may be a predetermined, non-zero, level of fuel calibrated based on a rate of fuel delivery via a nozzle.

The controller may also infer that refueling has been initiated based on an increase in fuel vapor pressure in the fuel tank. Fuel tank pressure may be monitored by the fuel tank pressure sensor. The increase in fuel vapor pressure in the fuel tank may be higher than a predetermined, non-zero threshold. In one example, the threshold pressure may be calibrated based on physical and chemical properties (such as vapor pressure, flash point, etc.) of the fuel used and ambient temperature. However, since the tank has been conditioned with fuel vapor prior to the initiation of fueling, the increase (spike) in pressure may be significantly lower (such as lower than one fifth) than pressure spikes observed in an un-conditioned (fuel vapor-less) fuel tank. Also, in a conditioned tank, a single, lower, spike may be observed in pressure immediately after initiation of fueling. Whereas, in a fuel vapor-less tank a second, higher spike may be observed as the fuel filling rate increases. Due to the lower pressure in the fuel tank, during refueling of a conditioned fuel tank, premature shut-off of fueling may be averted. FIG. 6A shows an example plot 600 of pressure change in an unconditioned, fuel vapor-less, fuel tank during refueling. The x-axis shows time in seconds. The left y-axis shows pressure in inches of water and flow rate in gallons per minute. The right y-axis shows volume dispensed (of fuel into fuel tank) in gallons. The first plot 602 shows a volume of fuel dispensed into the fuel tank via a dispenser at the gas station. The second plot 604 shows a flow rate of fuel as it is being delivered to the tank. The third plot 606 shows an amount of vapor present in the fuel tank. A fuel tank pressure transducer coupled to the fuel tank measures the pressure in the fuel tank and the amount of vapor present in the fuel tank is estimated as a function of the fuel tank pressure. The fourth plot, line 608 shows a pressure in the fuel tank.

As fuel is being sprayed into the fuel vapor-less fuel tank at a first flow rate, the fuel may flash and the air fuel mixture may cause a spike in pressure at time t1. The pressure in the fuel tank is directly proportional to the amount of vapor present in the fuel tank. The first spike in pressure may be 9 in $H_2O$. At time t2, the rate of fuel delivery may change from the first flow rate to a second, higher, flow rate. Due to the increase in the flow rate, there is a corresponding increase in the amount of vapor formed, causing a second spike in pressure at time t3. The second pressure spike having a magnitude of 21 in $H_2O$ may be higher than the first spike. Due to the high pressure spike, there is an increased possibility of fuel to come out of the nozzle (fuel spit back) and a premature shut-off (PSO) of fueling. The fueling may continue until time t4 when the tank is full.

FIG. 6B shows an example plot 650 of pressure change in a fuel tank conditioned with fuel vapor prior to refueling. The conditioning may be carried out by operating a fuel pump to agitate residual fuel in the fuel tank. The x-axis shows time in seconds. The left y-axis shows pressure in inches of water and flow rate in gallons per minute. The right y-axis shows volume dispensed (of fuel into fuel tank) in gallons. The first plot 622 shows a volume of fuel dispensed into the fuel tank via a dispenser at the gas station. The second plot 624 shows a flow rate of fuel as it is being delivered to the tank. The third plot, line 626 shows a pressure in the fuel tank.

As fuel is being sprayed into the conditioned fuel tank, due to the preexistence of fuel vapor in the tank, the fuel may not flash and a small spike is observed at time t1 (relative to the spike observed in plot 600 at t1). Without any further pressure spikes, fueling may continue until time t4 when the tank is full. Once fueling is completed, the operator may further insert the nozzle to make sure that the tank is full. Re-initiation of fueling in a fuel tank filled to capacity may give rise to discreet pressure spikes as seen at time t2.

In a fuel vapor-less fuel tank, fueling may be started at a lower first flow rate to limit the magnitude of the first pressure spike. A higher than threshold first pressure strike may cause PSO immediately after initiation of fueling. Whereas, for a conditioned fuel tank, due to the lower possibility of a pressure spike, fueling may be started at a higher flow rate.

Returning to FIG. 5, if it is determined that refueling has not yet been initiated, at 520, the fuel pump operation (active) may be maintained. If it is determined that refueling has been initiated, at 522, the controller may send a signal to the actuator coupled to the fuel pump to deactivate (stop operation) the fuel pump.

In this way, after a threshold duration of operating the vehicle with the engine not running, in response to a fuel tank coupled to an engine being in a fuel vapor-less condition, prior to filling the fuel tank with fuel, fuel vapor may be generated in the fuel tank by operating a fuel pump coupled to the tank until a fuel vapor pressure in the fuel tank increases to above a threshold pressure. By conditioning the fuel tank with fuel vapor before fueling is underway (such as before refueling begins, before fuel enters the fuel tank via a refilling passage/nozzle, etc.), possibility of pressure spikes caused by mixing of fuel with air in the fuel tank may be reduced.

FIG. 7 shows an example timeline 700 of refilling a fuel vapor-free fuel tank coupled to a hybrid electric vehicle. The hybrid vehicle can be operated via engine torque and/or motor torque. The horizontal (x-axis) denotes time and the vertical markers t1-t4 identify significant times in the routine for hybrid vehicle refueling.

The first plot, line 701, shows variation in vehicle speed over time. The second plot, line 702, shows operation of the engine. The engine may be rotated (On) by combusting fuel and air or may be maintained in an Off state while the vehicle may be operated via machine torque. The third plot, line 704, shows a fuel level of liquid fuel contained in the fuel tank, as estimated via a fuel level sensor housed in the fuel tank. Dashed line 703 denotes a maximum amount of fuel that may be contained in the fuel tank. The fourth plot, line 707, shows fuel tank pressure as estimated via a fuel tank pressure transducer (FTPT) sensor coupled to the fuel tank. Dashed line 705 denotes a threshold pressure at which it may be inferred that the fuel tank is full and further fueling is not desired. The threshold pressure may be pre-calibrated based on a fuel tank capacity and physical, and chemical properties of the fuel. The fifth plot, line 708, shows operation of a fuel pump (such as fuel pump 221 in FIG. 1) coupled to the fuel tank. The sixth plot, line 710, shows refueling at a gas station.

Prior to time t1, the vehicle is not being propelled and the engine is maintained in an off condition. A low level of fuel is present in the fuel tank and refueling is not being carried out. The fuel pump is not operated and pressure in the fuel tank is not actively monitored. At time t1, the vehicle is operated and the vehicle speed increases. The engine is continued to be in an off condition and only motor torque is sued for propelling the vehicle.

At time t1, the controller infers that the fuel tank will be refilled at a future time (t3). A start time for the filling of the fuel tank at a gas station is predicted based on one or more of a time remaining for the vehicle to reach a fueling station at the gas station and a fuel filler door being commanded to an open position. The time remaining to reach the fueling station is estimated based on a position of the vehicle, location of the gas station, and traffic condition immediately ahead of the vehicle as retrieved via one or more of a navigation system coupled to the vehicle, an external cloud wirelessly coupled to the vehicle, an infrastructure to vehicle (I2V) communication between the gas station and the vehicle, and a vehicle to vehicle (V2V) communication between one or more vehicles within a threshold distance from the vehicle and the vehicle.

In order to condition the fuel tank prior to initiation of fueling, at time t2, the controller sends a signal to the fuel pump to actuate the fuel pump. Between time t2 and t3, due to operation of the pump, the residual liquid fuel in the pump is agitated causing the fuel to vaporize. Vaporization of fuel in the tank creates a fuel vapor dome inside the fuel tank prior to fueling. At time t3, refueling is initiated at the gas station via a nozzle inserted in a passage coupled to the fuel tank. Prior to refueling, the fuel filler door is opened and the fuel cap is unlocked. Upon initiation of fueling, as inferred based on an increase in fuel level in the fuel tank, the fuel pump operation is discontinued.

As fuel is being delivered to the fuel tank, between time t3 and t4, the fuel level in the tank increases steadily. The pressure in the tank increases upon initiation of fueling and then stabilizes as fueling continues. Since the fuel tank is conditioned with fuel vapor prior to fueling, flashing of fuel upon mixing with air in the fuel tank and a consequent spike in fuel tank pressure is averted.

At time t4, based on the fuel tank pressure increasing to the threshold pressure 705 and also the fuel level in the tank increasing to the fuel tank capacity 703, it is inferred that fueling is complete. The pressure increase at time t4 causes the nozzle to self-shut-off. After time t4, the vehicle is continued to be operated without the engine running.

In this way, by preemptively conditioning a fuel tank initially devoid of fuel vapors with fuel vapors prior to refilling the tank, premature shut-off (PSO) of fueling caused by spikes in pressure in the tank may be averted. By predicting the start of an upcoming refueling event via inputs from one or more vehicle system and external sources, fuel vapor may be produced immediately prior to the fueling. The technical effect of conditioning a fuel vapor-less fuel tank prior to refueling is that a spraying type nozzle, commonly found in gas stations, may be used for refueling, without the need for specially designed non-spraying nozzles. Overall, by enabling fuel tank refill without PSO, operator satisfaction may be improved.

An example method for an engine coupled to a hybrid vehicle comprises: during vehicle operation in an electric-only mode for a longer than threshold duration, prior to an upcoming refill of a fuel tank devoid of hydrocarbon vapors, operating a fuel pump before fueling is underway. In any preceding example, additionally or optionally, the fuel tank contains a lower than threshold amount of liquid fuel during the vehicle operation in the electric-only mode for longer than the threshold duration and prior to the upcoming refill of the fuel tank, the threshold amount based on vapor pressure of fuel. In any or all of the preceding examples, additionally or optionally, the fuel tank contains air entering the fuel tank via a clean canister of an evaporative emissions control system coupled to the fuel tank. In any or all of the preceding examples, the method further comprising, additionally or optionally, during vehicle operation in the electric-only mode, flowing vapors from the fuel tank to the canister and storing the vapors at the canister and, upon meeting select conditions, purging the stored vapors from the canister to one or more engine cylinders. In any or all of the preceding examples, additionally or optionally, the upcoming refill of the fuel tank is inferred based on one or more of a proximity of the vehicle to a gas station, the gas station being indicated as a destination in a navigation system coupled to the vehicle, and a fuel filler door being commanded to an open position. In any or all of the preceding examples, additionally or optionally, proximity of the vehicle to the gas station is based on a global positioning satellite (GPS) position of the vehicle and a location of the gas station, as indicated by the navigation system. In any or all of the preceding examples, additionally or optionally, proximity of the vehicle to the gas station is further based on an infrastructure to vehicle (I2V) communication between the gas station and the vehicle and/or a vehicle to vehicle (V2V) communication between one or more vehicles at the gas station and the vehicle. In any or all of the preceding examples, additionally or optionally, the hybrid vehicle is an autonomous vehicle being dispatched to the gas station for refueling. In any or all of the preceding examples, additionally or optionally, operating a fuel pump before fueling is underway includes activating the fuel pump at a first time, and deactivating the fuel pump at a second time, wherein the first time corresponds to a threshold duration remaining until a predicted initiation of fueling, and wherein the second time corresponds to a higher than threshold increase in a fuel level in the fuel tank or a higher than threshold increase in pressure in the fuel tank, the fuel level estimated via a fuel level sensor housed in the fuel tank and the pressure estimated via a pressure sensor coupled to the fuel tank. In any or all of the preceding examples, additionally or optionally, the predicted initiation of fueling is based on a distance between the vehicle and the gas station, a time of the fuel filler door being commanded to the open position, and an average wait time for refueling at the gas station.

Another engine example method for a hybrid vehicle comprises: after a threshold duration of operating the vehicle with the engine not running, in response to a fuel tank coupled to an engine being in a fuel vapor-less condition, prior to filling the fuel tank with fuel, generating fuel vapor in the fuel tank by operating a fuel pump coupled to the tank until a fuel vapor pressure in the fuel tank increases. In any preceding example, additionally or optionally, the fuel vapor-less condition includes one or more of a lower than threshold pressure and a lower than threshold amount of liquid fuel in the fuel tank. In any or all of the preceding examples, the method further comprising, additionally or optionally, predicting a start time for the filling of the fuel tank at a gas station based on one or more of a time remaining for the vehicle to reach a fueling station at the gas station and a fuel filler door being commanded to an open position. In any or all of the preceding examples, additionally or optionally, the time remaining is estimated based on a position of the vehicle, location of the gas station, and traffic condition immediately ahead of the vehicle as retrieved via one or more of a navigation system coupled to the vehicle, an external cloud wirelessly coupled to the vehicle, an infrastructure to vehicle (I2V) communication between the gas station and the vehicle, and a vehicle to vehicle (V2V) communication between a fleet of vehicles and the vehicle. In any or all of the preceding examples, the method further comprising, additionally or optionally, activating the fuel pump at a threshold duration prior to the predicted start time and deactivating the fuel pump in response to an increase in fuel level in the fuel tank, the threshold duration based on the lower than threshold amount of liquid fuel in the tank and vapor pressure of the fuel. In any or all of the preceding examples, additionally or optionally, the increase in fuel vapor pressure in the fuel tank is over a predetermined, non-zero threshold, the increase in pressure estimated via a fuel tank pressure transducer (FTPT) sensor coupled to the fuel tank.

In yet another example, an autonomous vehicle system comprising, a controller with computer readable instructions stored on non-transitory memory that when executed during operation of the autonomous vehicle system cause the controller to: infer an upcoming refueling event via one or more of a position of the vehicle, a destination indicated on a navigation system coupled to the vehicle, and an opening of a fuel filler door; and during a first condition, operate a fuel pump coupled to a fuel tank prior to the upcoming refueling event until the refueling event is initiated, and during a second condition, maintain the fuel pump inactive prior to the upcoming refueling event. In any preceding example, additionally or optionally, the first condition includes a fuel tank coupled to an engine of the vehicle containing a lower than threshold amount of fuel vapor and a higher than threshold amount of air, and wherein the second condition includes the fuel tank containing a higher than threshold amount of fuel vapor and a lower than threshold amount of air. In any or all of the preceding examples, additionally or optionally, initiation of the refueling event is inferred based on an increase in a liquid fuel level in the fuel tank as estimated via a fuel level sensor coupled to the fuel tank and/or a higher than a threshold increase in pressure in the fuel tank as estimated via a pressure sensor coupled to the fuel tank. In any or all of the preceding examples, additionally or optionally, inferring the upcoming fueling event is further based on one or more of a communication between a gas station and the vehicle via infrastructure to vehicle (I2V) wireless technology between one or more vehicles at the gas station and the vehicle and a communication between one or more vehicles at the gas station and the vehicle via vehicle to vehicle (V2V) wireless technology.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine coupled to a hybrid vehicle, comprising:
during vehicle operation in an electric-only mode for a longer than threshold duration,
prior to an upcoming refill of a fuel tank devoid of hydrocarbon vapors, operating a fuel pump before fueling is underway.

2. The method of claim 1, wherein the fuel tank contains a lower than threshold amount of liquid fuel during the vehicle operation in the electric-only mode for longer than the threshold duration and prior to the upcoming refill of the fuel tank, the threshold amount based on vapor pressure of fuel.

3. The method of claim 1, wherein the fuel tank contains air entering the fuel tank via a canister of an evaporative emissions control system coupled to the fuel tank.

4. The method of claim 3, further comprising, during vehicle operation in the electric-only mode, flowing vapors from the fuel tank to the canister and storing the vapors at the canister and, upon meeting select conditions, purging the stored vapors from the canister to one or more engine cylinders.

5. The method of claim 1, wherein the upcoming refill of the fuel tank is inferred based on one or more of a proximity of the vehicle to a gas station, the gas station being indicated as a destination in a navigation system coupled to the vehicle, and a fuel filler door being commanded to an open position.

6. The method of claim 5, wherein proximity of the vehicle to the gas station is based on a global positioning satellite (GPS) position of the vehicle and a location of the gas station, as indicated by the navigation system.

7. The method of claim 5, wherein proximity of the vehicle to the gas station is based on at least one of an infrastructure to vehicle (I2V) communication between the gas station and the vehicle and a vehicle to vehicle (V2V) communication between one or more vehicles at the gas station and the vehicle.

8. The method of claim 5, wherein the hybrid vehicle is an autonomous vehicle being dispatched to the gas station for refueling.

9. The method of claim 5, wherein operating the fuel pump before fueling is underway includes activating the fuel pump at a first time, and deactivating the fuel pump at a second time, wherein the first time corresponds to a threshold duration remaining until a predicted initiation of fueling, and wherein the second time corresponds to a higher than threshold increase in a fuel level in the fuel tank or a higher than threshold increase in pressure in the fuel tank, the fuel level estimated via a fuel level sensor housed in the fuel tank and the pressure estimated via a pressure sensor coupled to the fuel tank.

10. The method of claim 9, wherein the predicted initiation of fueling is based on a distance between the vehicle and the gas station, a time of the fuel filler door being commanded to the open position, and an average wait time for refueling at the gas station.

11. A method for a hybrid vehicle, comprising:
after a threshold duration of operating the vehicle with an engine of the vehicle not running,
in response to a fuel tank coupled to the engine being in a fuel vapor-less condition, prior to filling the fuel tank with fuel, generating fuel vapor in the fuel tank by operating a fuel pump coupled to the tank until a fuel vapor pressure in the fuel tank increases.

12. The method of claim 11, wherein the fuel vapor-less condition includes one or more of a lower than threshold pressure and a lower than threshold amount of liquid fuel in the fuel tank.

13. The method of claim 11, further comprising, predicting a start time for the filling of the fuel tank at a gas station based on one or more of a time remaining for the vehicle to reach a fueling station at the gas station and a fuel filler door being commanded to an open position.

14. The method of claim 13, wherein the time remaining is estimated based on a position of the vehicle, location of the gas station, and traffic condition immediately ahead of the vehicle as retrieved via one or more of a navigation system coupled to the vehicle, an external cloud wirelessly coupled to the vehicle, an infrastructure to vehicle (I2V) communication between the gas station and the vehicle, and a vehicle to vehicle (V2V) communication between a fleet of vehicles and the vehicle.

15. The method of claim 13, further comprising, activating the fuel pump at a threshold duration prior to the predicted start time and deactivating the fuel pump in response to an increase in fuel level in the fuel tank, the threshold duration based on the lower than threshold amount of liquid fuel in the tank and vapor pressure of the fuel.

16. The method of claim 11, wherein the increase in fuel pressure in the fuel tank is over a predetermined, non-zero threshold, the increase in pressure estimated via a fuel tank pressure transducer (FTPT) sensor coupled to the fuel tank.

17. An autonomous vehicle system, comprising:
a controller with computer readable instructions stored on non-transitory memory that when executed during operation of the autonomous vehicle system cause the controller to:
infer an upcoming refueling event via one or more of a position of the vehicle, a destination indicated on a navigation system coupled to the vehicle, and an opening of a fuel filler door; and
during a first condition, operate a fuel pump coupled to a fuel tank prior to the upcoming refueling event, until the refueling event is initiated; and
during a second condition, maintain the fuel pump inactive prior to the upcoming refueling event, wherein first condition includes an amount of fuel vapor in the fuel tank being lower than a threshold amount.

18. The system of claim 17, wherein the second condition includes another amount of fuel vapor in the fuel tank being higher than the threshold amount.

19. The system of claim 17, wherein initiation of the refueling event is inferred based on at least one of an increase in a liquid fuel level in the fuel tank as estimated via a fuel level sensor coupled to the fuel tank and a higher than a threshold increase in pressure in the fuel tank as estimated via a pressure sensor coupled to the fuel tank.

20. The system of claim 17, wherein inferring the upcoming fueling event is further based on one or more of a communication between a gas station and the vehicle via infrastructure to vehicle (I2V) wireless technology and a communication between one or more vehicles at the gas station and the vehicle via vehicle to vehicle (V2V) wireless technology.

\* \* \* \* \*